United States Patent
Narasimha et al.

(10) Patent No.: US 8,457,074 B2
(45) Date of Patent: Jun. 4, 2013

(54) METHOD AND APPARATUS FOR MOBILE COMMUNICATION DEVICE MEASUREMENT REPORTING

(75) Inventors: Murali Narasimha, Lake Zurich, IL (US); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 696 days.

(21) Appl. No.: 12/542,280

(22) Filed: Aug. 17, 2009

(65) Prior Publication Data

US 2011/0039557 A1      Feb. 17, 2011

(51) Int. Cl.
*H04W 4/00*      (2009.01)

(52) U.S. Cl.
USPC ........... 370/332; 370/328; 370/331; 455/436; 455/437; 455/443; 455/444

(58) Field of Classification Search
None
See application file for complete search history.

(56) References Cited

U.S. PATENT DOCUMENTS

| | | | |
|---|---|---|---|
| 6,337,983 B1 | 1/2002 | Bonta et al. | |
| 6,445,917 B1 * | 9/2002 | Bark et al. | 455/423 |
| 6,512,927 B2 | 1/2003 | Hunzinger | |
| 6,553,231 B1 | 4/2003 | Karlsson et al. | |
| 6,763,234 B1 * | 7/2004 | Kabasawa | 455/436 |
| 7,082,303 B2 | 7/2006 | Sayeedi et al. | |
| 2008/0188215 A1 * | 8/2008 | Bergstrom et al. | 455/424 |
| 2008/0220784 A1 | 9/2008 | Somasundaram et al. | |
| 2008/0267153 A1 * | 10/2008 | Mukherjee et al. | 370/338 |
| 2009/0005029 A1 * | 1/2009 | Wang et al. | 455/423 |
| 2009/0046573 A1 | 2/2009 | Damnjanovic | |
| 2009/0046578 A1 | 2/2009 | Aydin et al. | |
| 2009/0069012 A1 * | 3/2009 | Tu | 455/436 |
| 2009/0104905 A1 * | 4/2009 | DiGirolamo et al. | 455/434 |

FOREIGN PATENT DOCUMENTS

| | | |
|---|---|---|
| EP | 1229754 A1 | 8/2002 |
| GB | 2434507 A | 7/2007 |
| WO | 2008114180 A2 | 9/2008 |
| WO | 2009022967 A9 | 2/2009 |
| WO | 2009044317 A2 | 4/2009 |
| WO | 2009051534 A1 | 4/2009 |

OTHER PUBLICATIONS

3GPP; TS 36.331; 3rd Generation Partnership Project; Technical Specification Group Radio Access Network; Evolved Universal Terrestrial Radio Access (E-UTRA); Radio Resource Control (RRC); Protocol Specification; Release 8; Jun. 2009.

(Continued)

*Primary Examiner* — Jason Mattis
*Assistant Examiner* — James P Duffy

(57) ABSTRACT

A method (300) and apparatus (110) for mobile communication device measurement reporting is disclosed. The method may include receiving (320) an offset value corresponding to a set of a plurality of cells. The method may include determining (330) that a signal strength of a serving cell (130) is higher than a radio link failure threshold of the serving cell by substantially no more than the offset value for measurement reporting. The method may include detecting (340) the presence of a candidate cell (140) that is a member of the set of the plurality of cells. The method may include transmitting (350) a measurement report to the serving cell if the signal strength of the serving cell is higher than the radio link failure threshold of the serving cell by substantially no more than the offset value for measurement reporting and if the candidate cell that is a member of the set of the plurality of cells is present.

19 Claims, 3 Drawing Sheets

OTHER PUBLICATIONS

3GPP TSG-RAN WG2#67, R2-094651, Measurements to Support Handover to CSG and Hybrid Cells Motorola, Aug. 24-28, 2009; Shenzhen, China; 4 pages.

Patent Cooperation Treaty, "PCT Search Report and Written Opinion of the International Searching Authority" for International Application No. PCT/US2010/042112 Jan. 25, 2011, 17 pages.

* cited by examiner

METHOD AND APPARATUS FOR MOBILE COMMUNICATION DEVICE MEASUREMENT REPORTING

RELATED APPLICATIONS

This application is related to the application entitled "Method and Apparatus for Radio Link Failure Recovery," U.S. Ser. No. 12/542,314, and the application entitled "Method and Apparatus for Radio Link Failure Recovery," U.S. Ser. No. 12/542,339, each of which is filed on the same date as the present application, each of which is commonly assigned to the assignee of the present application, and each of which is incorporated herein by reference in its entirety.

BACKGROUND

1. Field

The present disclosure is directed to a method and apparatus for mobile communication device measurement reporting. More particularly, the present disclosure is directed to transmitting a measurement report based on the signal strength of a serving cell in a wireless communication system.

2. Introduction

Presently, in telecommunications, a home cell, such as a Closed Subscriber Group (CSG) cell, a hybrid cell, a femtocell, a picocell or other home cell can use a small coverage cellular base station typically designed for use in residential or small business environments. It connects to a service provider network via a wired or wireless backhaul connection. Current designs of femtocells typically support 2 to 4 active mobile phones in a residential setting. A home cell allows service providers to extend service coverage indoors, especially where access would otherwise be limited or unavailable. A home cell can also provide services to the user that may not be available on a conventional macro cell, such as, for example, mobile television services or less expensive calling plan services. The home cell incorporates the functionality of a typical base station but extends it to allow a simpler, self-contained deployment.

For example, home cells, such as CSG cells or hybrid cells, are cells used for deployment in a campus or are individual cells used for deployment in users' homes. The home cells co-exist with macro cells and have a smaller coverage area than macro cells. Unlike macro cells, the home cells are unplanned, in that the operator has much less control over their placement and configuration than with macro cells.

Handover between macro cells, such as in a long term evolution system, is based on receiving measurements from a mobile communication device that indicate that the mobile communication device sees better signal quality from a particular neighbor cell than the serving cell. The network configures an A3 measurement event to receive measurement reports for performing handover. The event is normally configured so that the mobile communication device sends a measurement report indicating that the report was triggered by event A3 when a candidate cell is a certain amount of dB better than the serving cell.

When macro cells and home base stations are deployed on the same carrier, the drivers for handover are different. The home base stations are deployed for hotspot coverage in homes, offices etc. Unfortunately, if a home base station is located close to the macro cell, the macro cell signal strength can be significantly stronger that the home base station signal strength even when the mobile communication device is close to the home base station, such as when the user is in the home. In this case, it can be useful to handover the mobile communication device to the home base station even when the signal conditions at the home base station are unfavorable. This would allow the user to avail of any special services available through the home base station. Furthermore, home base stations are not included in the neighbor cell list. Therefore, cell specific offsets cannot be provided for home base stations. Inclusion of home base stations in the neighbor cell list is considered impractical, because home base stations are uncoordinated deployments, and there can be large numbers of them. Thus, the event A3, as defined above, does not fully enable handover to home base stations. Therefore, there is a need for a measurement reporting configuration that allows for handover to home base stations.

SUMMARY

A method and apparatus for mobile communication device measurement reporting is disclosed. The method may include receiving an offset value for measurement reporting. The method may include determining that a signal strength of a serving cell is higher than a radio link failure threshold of the serving cell by substantially no more than the offset value for measurement reporting. The method may include detecting the presence of a candidate cell that is a member of the set of the plurality of cells. The method may include transmitting a measurement report to the serving cell if the signal strength of the serving cell is higher than a radio link failure threshold of the serving cell by substantially no more than the offset value for measurement reporting and if the candidate cell that is a member of the set of the plurality of cells is present.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
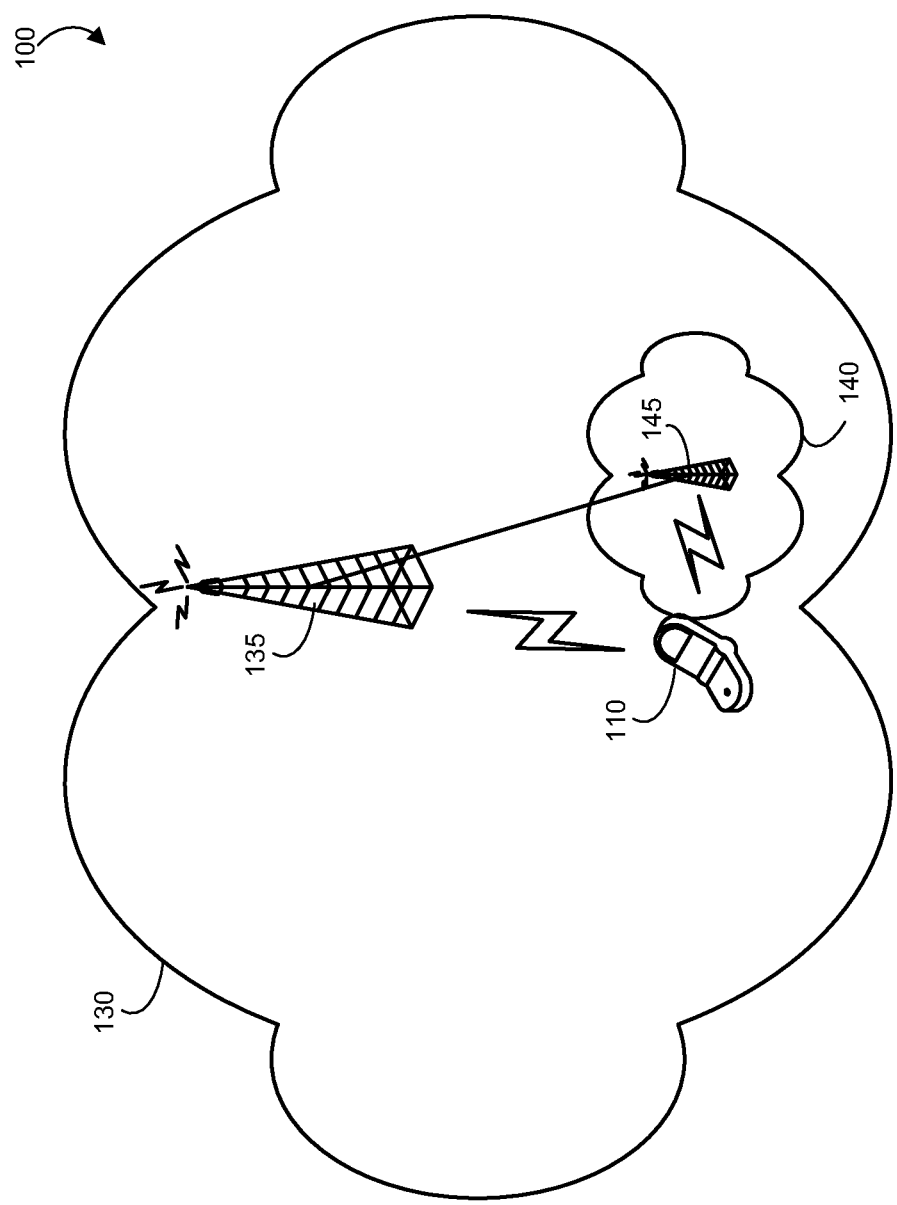
FIG. 1 illustrates an exemplary system in accordance with a possible embodiment.

FIG. 1 is an exemplary block diagram of a system 100 according to a possible embodiment. The system 100 can include a terminal 110, a serving or macro cell 130 including a base station 135, and a candidate cell 140 including a candidate base station 145, such as a macro base station, a home base station, an access point or other base station. The terminal 110 may be a mobile station, such as a wireless communication device, which can be a wireless telephone, a cellular telephone, a personal digital assistant, a pager, a personal computer, a selective call receiver, or any other device that is capable of sending and receiving communication signals on a network including a wireless network. The candidate cell 140 can be a macro cell or a home cell, such as a closed subscriber group (CSG) cell, a hybrid cell, a femtocell, a picocell, a relay node, or other candidate cell. For example, home cells can be cells with a small footprint, such as low power as compared to a macro cell. The candidate cell 140 can be located within a coverage area of the serving cell 130. As a further example, the candidate base station 145 can be a candidate cell base station, such as a home base station, like a user base station, a home NodeB, a Third Generation Partnership Project (3GPP) home NodeB and/or can be a closed subscriber group (CSG) base station, as defined in a third generation partnership project based standard or can be any other home base station. A third generation partnership project home NodeB can also be a long term evolution (LTE) closed subscriber group or hybrid base station based on present third generation partnership project long term evolution closed subscriber group base station features. A candidate cell base station 145 can also be a Universal Mobile Telecommunications System (UMTS) home base station or a typical macro base station. Furthermore, a long term evolution closed subscriber group cell, such as the cells 130 and 140, can include any cell that is a present or future result of present and/or future modified third generation partnership project long term evolution closed subscriber group cell features.

The system 100 can be a wireless telecommunications network, such as a Time Division Multiple Access (TDMA) network, like a $3^{rd}$ Generation Partnership Project (3GPP) Long Term Evolution (LTE) network, can be a Universal Mobile Telecommunications System (UMTS), and/or can be other like communications systems. Furthermore, the system 100 may include more than one network and may include a plurality of different types of networks.

In operation, the terminal 110 can receive an offset value corresponding to a set of a plurality of cells. The terminal 110 can take a signal strength measurement of the serving cell 130 signal strength. The terminal 110 can also receive an offset value for measurement reporting. The terminal 110 can determine that the signal strength of a serving cell 130 is higher than a radio link failure threshold of the serving cell 130 by substantially no more than an offset value for measurement reporting. The terminal 110 can detect the presence of the candidate cell 140 that is a member of the set of the plurality of cells. The terminal 110 can transmit a measurement report to the serving cell 130 if the signal strength of the serving cell 130 is higher than a radio link failure threshold of the serving cell 130 by substantially no more than the offset value for measurement reporting and if the candidate cell 140 that is a member of the set of the plurality of cells is present. The measurement report can indicate that an event that corresponds to the signal strength of the serving cell 130 being higher than a radio link failure threshold of the serving cell 130 by substantially no more than the offset value for measurement reporting has been triggered.

For example, an offset value can be provided that corresponds to a set of cells. The set of cells can correspond to a range of physical cell identifiers that are reserved for closed subscriber group cells, hybrid cells, picocells, femtocells or other home cells. According to one example, the terminal 110 can receive an offset for closed subscriber group cells that corresponds to an event. The terminal 110 can detect a closed subscriber group cell. The terminal 110 can determine that the difference in signal strength between the serving cell 130 and the closed subscriber group cell is more than or equal to the offset. The terminal 110 can check whether it is allowed to access the closed subscriber group cell. This generally can include reading system information to obtain a closed subscriber group identifier for the closed subscriber group call. If the terminal 110 is allowed to access the closed subscriber group cell, then the terminal 110 can send a measurement report indicating that the corresponding event has been triggered. The measurement report can include a measurement of the closed subscriber group cell and can include a closed group identifier of the closed subscriber group cell.

According to another example, the terminal 110 can receive an offset for hybrid cells. The terminal 110 can determine that the serving cell signal strength is within an offset of the signal strength corresponding to radio link failure for the serving cell 130. The terminal 110 can detect another cell. The terminal 110 can determine that the another cell is a hybrid cell or other home cell. This determination can be based on hybrid cells or other home cells having a separate physical identifier range or based on the terminal 110 reading system information of the cell. The terminal 110 can send a measurement report indicating that the corresponding event has been triggered. The measurement report can include a measurement of the another cell and can include a cell identifier of the another cell. The cell identifier can be a unique identifier of the another cell.

Figure 2:
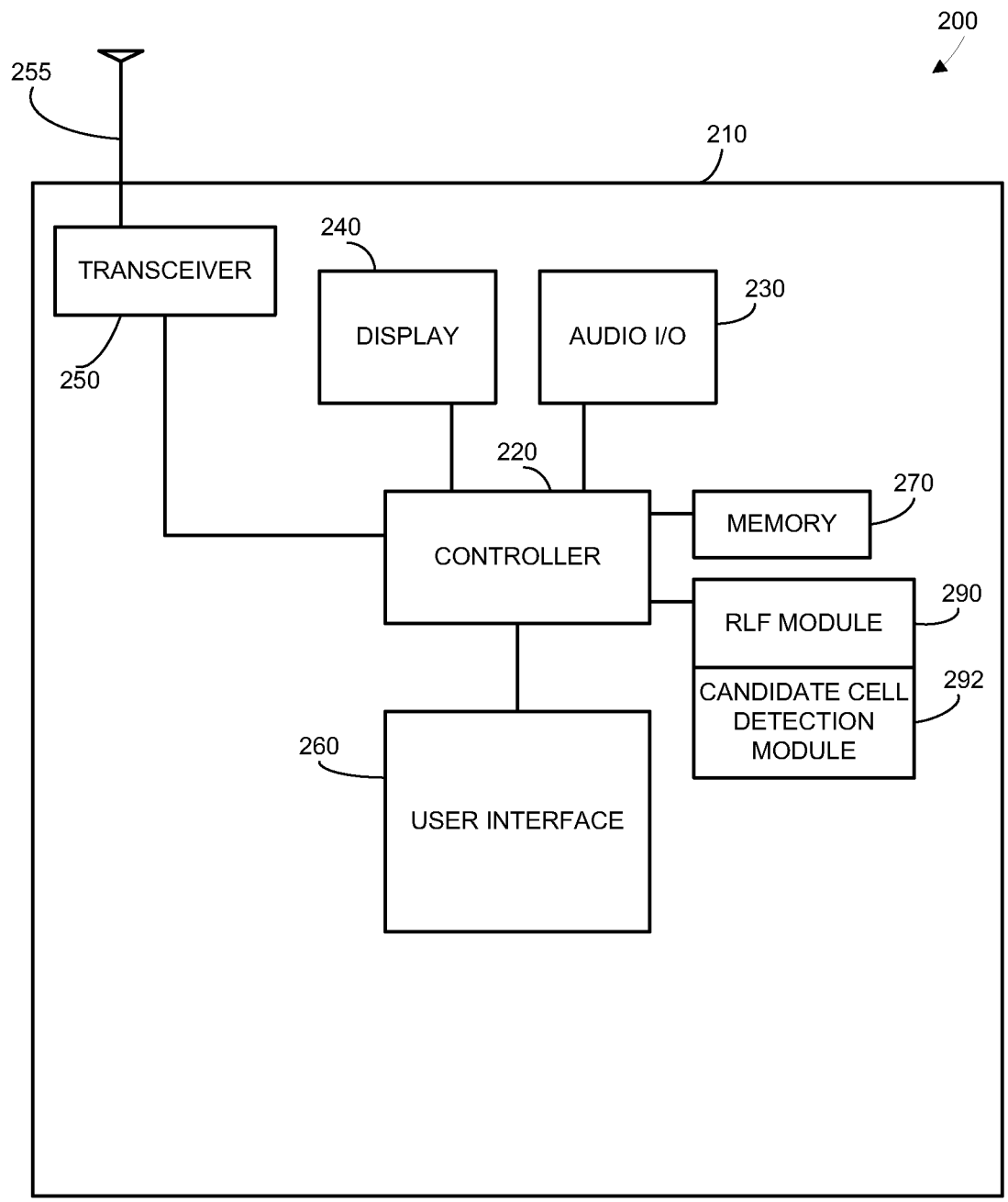
FIG. 2 illustrates an exemplary block diagram of a wireless communication device in accordance with a possible embodiment.

FIG. 2 is an exemplary block diagram of a wireless communication device 200, such as the terminal 110, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, an antenna 255 coupled to the transceiver 250, a user interface 260 coupled to the housing 210, and a memory 270 coupled to the housing 210. The wireless communication device 200 can also include a radio link failure module 290 and a candidate cell presence detection module 292. The radio link failure module 290 and the candidate cell presence detection module 292 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver and can include more than one transceiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the transceiver 250 can be configured to receive an offset value corresponding to a set of a plurality of cells. The controller 220 can be configured to control operations of the wireless communication device 200. The controller 220 can also be configured to take a signal strength measurement of a serving cell signal strength and configured to take a signal strength measurement of a candidate cell signal strength. The controller 220 can also determine an offset value for measurement reporting. For example, the controller 220 can receive the offset value for measurement reporting via the transceiver 250. The radio link failure module 290 can be configured to determine that the signal strength of a serving cell is higher than a radio link failure threshold of the serving cell by substantially no more than the offset value for measurement reporting. For example, the offset value can correspond to the set of a plurality of cells. The candidate cell presence detection module 292 can be configured to detect the presence of a candidate cell that is a member of the set of the plurality of cells. The controller 220 can be configured to transmit, via the transceiver, a measurement report to the serving cell if the signal strength of the serving cell is higher than a radio link failure threshold of the serving cell by substantially no more than the offset value for measurement reporting and if the candidate cell that is a member of the set of the plurality of cells is present.

The measurement report can include at least one of a measurement of the signal strength of the candidate cell and a cell identifier of the candidate cell. The measurement report can indicate that an event that corresponds to the signal strength of the serving cell being higher than a radio link failure threshold of the serving cell by substantially no more than the offset value for measurement reporting has been triggered.

The controller 220 can also be configured to determine that the mobile station is allowed to access the candidate cell. The controller 220 can be configured to determine that the mobile station is allowed to access the candidate cell by reading system information to obtain a cell identifier of the candidate cell and by determining that the mobile station is allowed to access the candidate cell based on the cell identifier. This determination may be made for closed subscriber group cells, but it may not be necessary. For example, the candidate cell may be a hybrid cell that can grant access to all mobile stations, but a certain member class of mobile stations may get preferred access to the hybrid cell. The controller 220 can further be configured to transmit the measurement report to the serving cell if the signal strength of the serving cell is higher than a radio link failure threshold of the serving cell by substantially no more than the offset value for measurement reporting, if the candidate cell that is a member of the set of the plurality of cells is present, and if the mobile station is allowed to access the candidate cell.

The candidate cell presence detection module 292 can be configured to detect the presence of a candidate cell by detecting the presence of the candidate cell and by determining that the candidate cell is a member of the set of the plurality of cells. The candidate cell presence detection module 292 can be configured to determine that the candidate cell is a member of the set of the plurality of cells based on the candidate cell having a physical cell identifier that is in a range of physical cell identifiers corresponding to the set of the plurality of cells.

Figure 3:
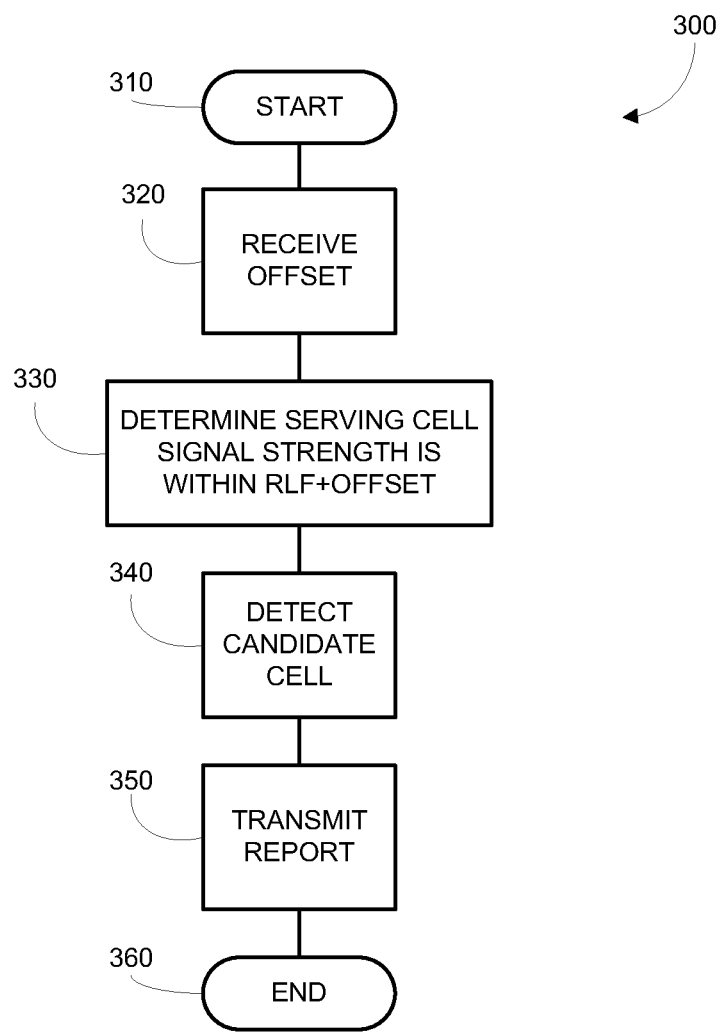
FIG. 3 is an exemplary flowchart illustrating the operation of a wireless communication device in accordance with a possible embodiment.

FIG. 3 is an exemplary flowchart 300 illustrating the operation of the wireless communication device 200 according to a possible embodiment. At 310, the flowchart begins. At 320, an offset value for measurement reporting can be received. For example, an offset value corresponding to a set of a plurality of cells can be received. At 330, a signal strength of a serving cell can be determined to be higher than a radio link failure threshold of the serving cell by substantially no more than the offset value for measurement reporting. To make this determination, a signal strength measurement can be taken of the serving cell signal strength.

At 340, the presence of a candidate cell that is a member of the set of the plurality of cells can be detected. Detecting the presence of a candidate cell can include taking a signal strength measurement of the candidate cell signal strength. When detecting the presence, whether the mobile station is allowed to access the candidate cell can be determined. Determining whether the mobile station is allowed to access the candidate cell can include reading system information to obtain a cell identifier of the candidate cell and determining that the mobile station is allowed to access the candidate cell based on the cell identifier. The cell identifier can be a closed subscriber group identifier. This determination may be made for closed subscriber group cells, but it may not be necessary. For example, the candidate cell may be a hybrid cell that can grant access to all mobile stations, but a certain member class of mobile stations may get preferred access to the hybrid cell.

Detecting the presence of a candidate cell can further include detecting the presence of the candidate cell and determining that the candidate cell is a member of the set of the plurality of cells. Determining the candidate cell is a member of the set of the plurality of cells can be based on the candidate cell having a physical cell identifier that is in a range of physical cell identifiers corresponding to the set of the plurality of cells.

At 350, a measurement report can be transmitted to the serving cell if the signal strength of the serving cell is higher than a radio link failure threshold of the serving cell by substantially no more than the offset value for measurement reporting and if the candidate cell that is a member of the set of the plurality of cells is present. The measurement report can be transmitted to the serving cell if the signal strength of the serving cell is higher than a radio link failure threshold of the serving cell by substantially no more than the offset value for measurement reporting, if the candidate cell that is a member of the set of the plurality of cells is present, and if the mobile station is allowed to access the candidate cell. The measurement report can include at least one of a measurement of the signal strength of the candidate cell and a cell identifier of the candidate cell. For example, a candidate cell identifier can be a physical cell identifier, a home cell identifier, a closed subscriber group identifier, or other cell identifier. The measurement report can indicate that an event that corresponds to the signal strength of the serving cell being higher than a radio link failure threshold of the serving cell by substantially no more than the offset value for measurement reporting has been triggered. At 360, the flowchart 300 ends.

For example, a handover to a home base station, such as a HeNB, can be delayed until the connection to the serving cell becomes so weak that a radio link failure could occur. A measurement configuration can be configured in a mobile station to detect and report HeNBs. The measurement configuration can provide an offset, and the mobile station can use this offset along with a radio link failure threshold for a serving cell to trigger sending a measurement report indicating that the signal strength of the serving cell is below the radio link failure threshold of the serving cell plus the offset.

Another embodiment may include receiving an offset value or an absolute value corresponding to a measurement event for performing measurement reporting of at least one of a set of a plurality of cells. The method may include detecting the presence of a candidate cell that is a member of the set of the plurality of cells. The method may include determining that a difference between the signal strength of a serving cell and the signal strength of the candidate cell is higher than the offset value corresponding to the measurement event for performing measurement reporting of at least one of the set of the plurality of cells. Alternatively, the method may include determining that the signal strength of the candidate cell is higher than an absolute value corresponding to the measurement event for performing measurement reporting of at least one of the set of the plurality of cells. The method may include determining that the mobile station may be allowed to access the candidate cell. The method may include transmitting a measurement report to the serving cell if the difference between the signal strength of a serving cell and the signal strength of the candidate cell is higher than the offset value corresponding to the measurement event for performing measurement reporting of at least one of the set of the plurality of cells and if the mobile station may be allowed to access the candidate cell. Alternatively, the method may include transmitting a measurement report to the serving cell if the signal strength of the candidate cell is higher than an absolute value corresponding to the measurement event for performing measurement reporting of at least one of the set of the plurality of cells and if the mobile station may be allowed to access the candidate cell.

For example, the set of a plurality of cells may correspond to a set of home cells, CSG cells or low transmit power cells. The determination that the mobile station may be allowed to access the candidate cell may be performed by acquiring the system information of the candidate cell and determining an identifier of the candidate cell in the acquired system information. Alternatively, the determination that the mobile station may be allowed to access the candidate cell may be performed by determining that the location of the mobile station is substantially close to the location of a CSG cell that the mobile station is allowed to access. The determination that the mobile station is substantially close to the location of a CSG cell that the mobile station is allowed to access may be performed by comparing a radio environment fingerprint at the mobile station's present location to a stored radio environment fingerprint. The measurement report may include a unique identifier of the candidate cell. The measurement report may also include an indication that the measurement report was triggered by the difference between the signal strength of a serving cell and the signal strength of the candidate cell being higher than the offset value corresponding to the measurement event for performing measurement reporting of at least one of the set of the plurality of cells.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a mobile station, the method comprising:
   receiving an offset value for measurement reporting;
   determining that a signal strength of a serving cell is higher than a radio link failure threshold of the serving cell by no more than the offset for measurement reporting;
   detecting a presence of a candidate cell; and
   transmitting a measurement report to the serving cell indicating the presence of the candidate cell if the signal strength of the serving cell is higher than the radio link failure threshold of the serving cell by no more than the offset for measurement reporting,
   wherein the method further comprises determining that the mobile station is allowed to access the candidate cell, and wherein transmitting comprises transmitting the measurement report to the serving cell if the signal strength of the serving cell is higher than the radio link failure threshold of the serving cell by no more than the offset for measurement reporting, and if the mobile station is allowed to access the candidate cell.

2. The method according to claim 1, wherein determining that the mobile station is allowed to access the candidate cell includes reading system information to obtain an identifier of the candidate cell and determining that the mobile station is allowed to access the candidate cell based on the identifier.

3. The method according to claim 1, further comprising receiving an indication of a set of a plurality of cells,
   wherein detecting the presence of the candidate cell comprises detecting the presence of the candidate cell and determining that the candidate cell is a member of the set of the plurality of cells.

4. The method according to claim 3, where the set of the plurality of cells comprises home cells, wherein a home cell comprises one of a closed subscriber group cell and a hybrid cell.

5. The method according to claim 3, wherein determining that the candidate cell is a member of the set of the plurality of cells is based on the candidate cell having a physical cell identifier that is in a range of physical cell identifiers corresponding to the set of the plurality of cells.

6. The method according to claim 1, wherein the measurement report includes at least one of a measurement of the signal strength of the candidate cell and a cell identifier of the candidate cell.

7. The method according to claim 1, wherein the measurement report indicates that an event that corresponds to the signal strength of the serving cell being higher than a radio link failure threshold of the serving cell by no more than the offset value for measurement reporting has been triggered.

8. The method according to claim 1, further comprising:
   taking a signal strength measurement of the serving cell signal strength; and
   taking a signal strength measurement of the candidate cell signal strength.

9. The method according to claim 1, wherein the radio link failure threshold is a function of the radio conditions at the mobile station.

10. An apparatus comprising:
a wireless communication device housing;
a transceiver coupled to the wireless communication device housing, the transceiver configured to receive an offset value for measurement reporting;
a controller coupled to the transceiver, the controller configured to control operations of the apparatus;
a radio link failure module coupled to the controller, the radio link failure module configured to determine that a signal strength of a serving cell is higher than a radio link failure threshold of the serving cell by no more than the offset value for measurement reporting; and
a candidate cell presence detection module coupled to the controller, the candidate cell presence detection module configured to detect a presence of a candidate cell that is a member of the set of the plurality of cells,
wherein the controller is configured to transmit, via the transceiver, a measurement report to the serving cell if the signal strength of the serving cell is higher than the radio link failure threshold of the serving cell by no more than the offset value for measurement reporting and if the candidate cell that is a member of the set of the plurality of cells is present,
wherein the controller is configured to determine that a mobile station is allowed to access the candidate cell, and wherein the controller is configured to transmit the measurement report to the serving cell if the signal strength of the serving cell is higher than the radio link failure threshold of the serving cell by no more than the offset value for measurement reporting, if the candidate cell that is a member of the set of the plurality of cells is present, and if the mobile station is allowed to access the candidate cell.

11. The apparatus according to claim 10, wherein the controller is configured to determine that the mobile station is allowed to access the candidate cell by reading system information to obtain a cell identifier of the candidate cell and by determining that the mobile station is allowed to access the candidate cell based on the cell identifier.

12. The apparatus according to claim 10, wherein the candidate cell presence detection module is configured to detect the presence of the candidate cell by detecting the presence of the candidate cell and by determining that the candidate cell is a member of the set of the plurality of cells.

13. The apparatus according to claim 12, wherein the candidate cell presence detection module can be configured to determine that the candidate cell is a member of the set of the plurality of cells based on the candidate cell having a physical cell identifier that is in a range of physical cell identifiers corresponding to the set of the plurality of cells.

14. The apparatus according to claim 10, wherein the measurement report includes at least one of a measurement of the signal strength of the candidate cell and a cell identifier of the candidate cell.

15. The apparatus according to claim 10, wherein the measurement report indicates that an event that corresponds to the signal strength of the serving cell being higher than the radio link failure threshold of the serving cell by no more than the offset value for measurement reporting has been triggered.

16. The apparatus according to claim 10, where the set of plurality of cells comprises home cells, wherein a home cell comprises one of a closed subscriber group cell and a hybrid cell.

17. The apparatus according to claim 10, wherein the controller is configured to take a signal strength measurement of the serving cell signal strength and configured to take a signal strength measurement of the candidate cell signal strength.

18. A method in a base station comprising:
receiving, from a mobile station, a measurement report indicating that a signal strength of the base station is higher than a radio link failure threshold of the base station by no more than an offset for measurement reporting; and
performing handover of the mobile station to a target base station in response to receiving the measurement report if the mobile station is allowed to access the target base station.

19. The method according to claim 18,
wherein the measurement report further indicates the presence of a candidate cell, and
wherein the performing handover of the mobile station to a target base station includes performing handover of the mobile station to the candidate cell in response to receiving the measurement report.

* * * * *